Jan. 16, 1940. H. NERWIN 2,187,246
PHOTOGRAPHIC CAMERA
Filed Nov. 23, 1938 2 Sheets-Sheet 1

Inventor:
Hubert Nerwin
By Singer & Stern
Attys.

Jan. 16, 1940.　　　　H. NERWIN　　　　2,187,246
PHOTOGRAPHIC CAMERA
Filed Nov. 23, 1938　　　　2 Sheets-Sheet 2
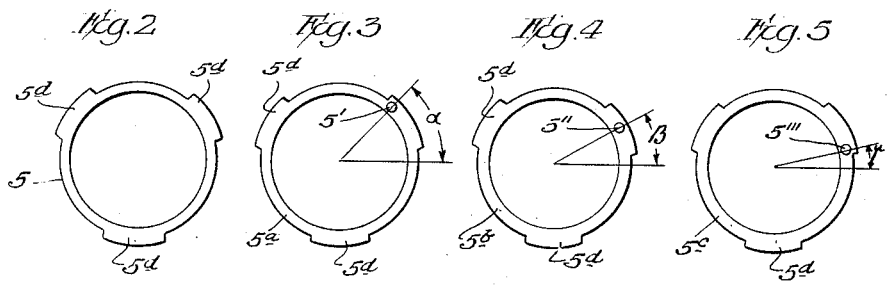
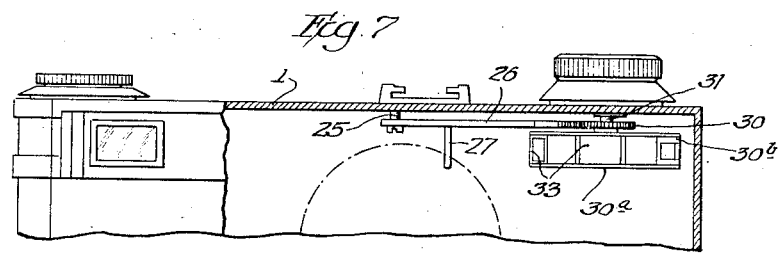
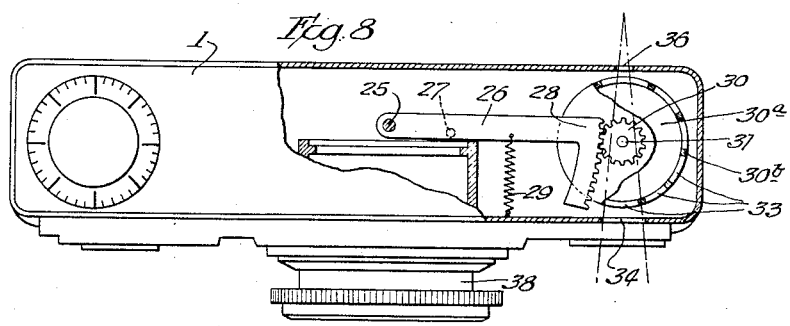
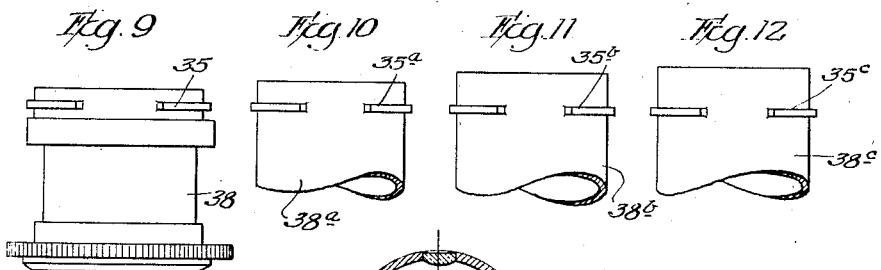
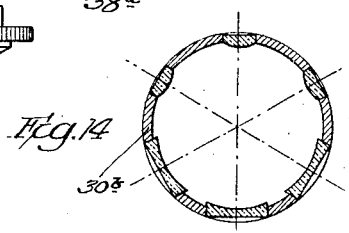
Inventor
Hubert Nerwin
By B. Singer & F. Stern
Attys.

Patented Jan. 16, 1940

2,187,246

UNITED STATES PATENT OFFICE 2,187,246

PHOTOGRAPHIC CAMERA

Hubert Nerwin, Dresden-Reick, Germany, assignor to Zeiss Ikon Aktiengesellschaft, Dresden, Germany Application November 23, 1938, Serial No. 241,896
In Germany December 10, 1937

13 Claims. (Cl. 88—1.5)

The invention relates to improvements in photographic cameras and particularly is directed to a camera adapted to be provided with any one of a number of interchangeable photographic objectives.

It is an object of the invention to provide the camera with means for automatically adjusting the size of the image area appearing in the finder to correspond to the picture angle or focal length of the selected photographic objective when the latter is attached to the camera.

Another object of the invention is to provide the camera with an adjusting mechanism for the size of the image area appearing in the finder, which adjusting mechanism is actuated by the mount of the photographic objective when the latter is secured in operative position on the camera.

Other objects of the invention will be apparent or will be particularly pointed out in the following description with reference to the accompanying drawings, but it is to be understood that the invention is not limited to the embodiments described and illustrated, as various other forms may be adopted within the scope of the claims.

In the drawings:

Figs. 2 to 5 illustrate diagrammatically end views of interchangeable objective mounts adapted to be used with the camera of the present invention.

Fig. 7 illustrates in elevation the upper portion of another modification of a camera in accordance with the present invention, a portion of the front wall is broken away.

Fig. 8 is a top view of the camera shown in Fig. 7, with a portion of the top wall broken away.

Figs. 9 to 12 illustrate diagrammatically each an exchangeable objective mount for the camera disclosed in the Figs. 7 and 8.

Fig. 14 illustrates in an enlarged horizontal sectional view a modified construction of the drum which varies the viewing area of the finder.

Figure 1:
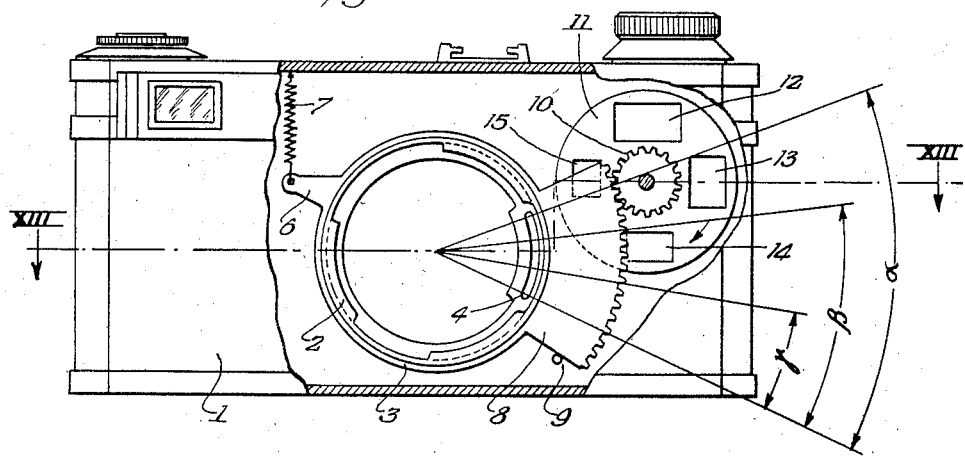
Fig. 1 is a front elevation view of a camera of the present invention, with a portion of the front wall broken away to disclose the adjusting mechanism for the image area of the finder.
Figure 13:
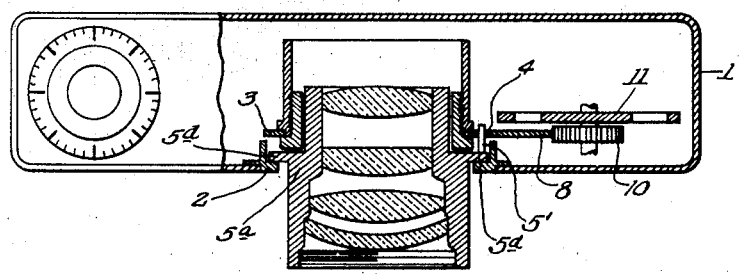
Fig. 13 is a horizontal sectional view along the broken line XIII—XIII in Fig. 1 with a photographic objective attached to the camera.

Referring to Figs. 1 and 13 the camera casing I has attached to its front wall a locking ring 2 forming one member of a bayonet joint, whose other member forms a part of the mount 5 of the camera objective. The locking ring 2 constitutes the socket of the bayonet joint and is adapted to receive any one of a number of objective mounts 5, 5ª, 5ᵇ or 5ᶜ (Figs. 2 to 5) provided with the customary bayonet lugs 5ᵈ.

An annular disc 3 provided with an arcuate slot 4 is rotatably mounted within the camera casing coaxially with respect to the locking ring 2. A pin 5', 5'' or 5''' on the objective mount 5ª, 5ᵇ and 5ᶜ respectively, is adapted to enter the arcuate slot 4 of the disc 3 when the respective objective mount is inserted in the locking ring 2. The annular disc 3 is provided with a gear segment 8 and a radially extending arm 6, the latter of which is attached to one end of a spring 7 whose other end is anchored to a suitable place in the camera casing and normally urges the annular disc 3 in clockwise direction to maintain one edge of the gear segment 8 in engagement with a stop pin 9. The gear segment 8 meshes with a gear 10 fixedly and coaxially connected with a finder masking disc 11 provided with a number of window openings 12, 13, 14 and 15. Each window has a different size to correspond to the focal length of the objective with which it is to be used.

In the normal position of the annular disc 3 as illustrated in Fig. 1, the largest window 12 of the diaphragm disc 11 is in alinement with the finder viewing opening of the camera and there appears in the finder an image whose area covers the area of scene which is photographed by the objective in the mount 5 (Fig. 2). When the mount 5 is inserted in the locking ring 2 the annular disc 3 remains in the position illustrated in Fig. 1.

If, however, the mount 5ª (Fig. 3), containing a photographic objective of a different focal length as in mount 5, is inserted in the locking ring 2, then the pin 5' on the mount 5ª enters the arcuate slot 4 of the annular disc 3 and when the mount 5ª is partially rotated to lock it in its operative position the pin 5', which engages one end of the slot 4, rotates the disc 3 about an angle α. This has the result that the window 13 of the disc 11 is moved in alinement with the finder viewing opening and that the area of the image appearing in the finder will be smaller to correspond with the focal length of the objective in the mount 5ª.

When the mount 5ᵇ (Fig. 4) is inserted in the locking ring 2, the pin 5'' upon rotation of the mount toward locking position, at first moves freely in the slot 4 of the disc 3 until it engages the end of slot 4 and then rotates the disc 3 about the angle β, which brings the window 14 of the disc 11 in alinement with the finder viewing opening, so as to limit the finder image area in accordance with the focal length of the objective in mount 5$^b$.

The mount 5$^c$ when inserted in the locking ring 2 effects in similar manner a rotation of the annular disc 3 by the pin 5''' about the angle γ, to bring the smallest window 15 of the disc 11 in alinement with the finder viewing opening, so as to restrict the finder image area in accordance with the focal length of the objective in the mount 5$^c$.

As soon as any one of the mounts 5$^a$, 5$^b$ or 5$^c$ is removed from the camera, the annular disc 3 and therewith the finder masking disc 10 return automatically to their initial or normal position illustrated in Fig. 1.

Figure 6:
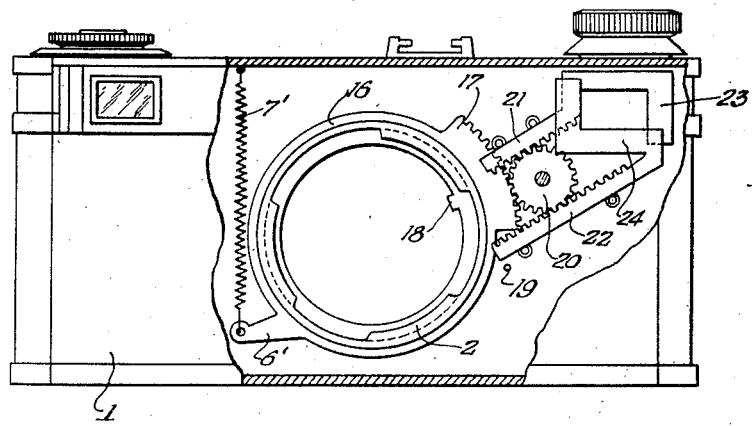
Fig. 6 illustrates a modification of a camera of the invention, in similar manner as Fig. 1.

Fig. 6 illustrates a modification of the invention, in which a gradually variable diaphragm is employed for adjusting the image area of the finder in accordance with the focal lengths of the interchangeable objectives. An annular disc 16, which corresponds to the disc 3 of the first embodiment, is rotatably mounted within the camera casing 1 coaxially with the locking ring 2 and is provided with a radially inwardly extending projection 18 adapted to be engaged by a pin similar to the previously mentioned pins 5', 5'' and 5''' on the objective mount when the latter is inserted and locked in the locking ring 2. The annular disc 16 is provided also with an outwardly extending gear segment 17 and an arm 6' which latter is connected by a spring 7' with a fixed point in the camera casing 1. The spring 7' normally urges the gear segment 17 on the annular disc 16 in engagement with a stop pin 19. A gear 20 meshes with the gear segment 17 and meshes also on two diametrically opposed points with two parallel rack bars 21 and 22 respectively. The rack bars 21, 22 are slidably supported in the camera casing in any suitable manner. It will be noted that the rack bars 21 and 22 are moved by said gear 20 simultaneously in opposite direction along lines which are parallel to each other, but at an angle with respect to the horizontal, namely, approximately parallel to one diagonal of the finder window.

Each rack bar carries at one of its ends an angle member 23 and 24 respectively, forming together a rectangular frame or mask which is positioned in alinement with the viewing aperture of the finder of the camera. The size of the opening formed by the angle members 23, 24 is automatically changed by the gearing 17, 20 and the rack bars 21, 22 whenever another objective mount containing an objective giving a different focal length is attached to the camera.

It will be noted from Fig. 6, that departing from the embodiment of Fig. 1, the finder viewing area is normally adjusted to its smallest size, when the spring 7' has moved the gear segment 17$^c$ so far in clockwise direction that it engages the stop pin 19. In such a case the rack bars 21 and 22 are in a position with respect to each other in which the angle members 23, 24 produce between the same the smallest window which corresponds to an objective having the longest focal length of all the objectives available for the particular camera. The mount containing the objective having the shortest focal length would engage with its adjusting pin the projection 18 of the annular disc 16 and would rotate the same the maximum amount corresponding to the angle α in Fig. 1, in order to adjust the image area appearing in the finder to its largest size. The mount containing the objective having the longest focal length need not be equipped with an adjusting pin. The mount containing the objective having the next shorter focal length is equipped with an adjusting pin adapted to rotate the annular disc 16 about the angle β, and the mount containing the objective having the second shortest focal length is equipped with an adjusting pin adapted to rotate the annular disc 16 about an angle γ.

In the modification of the invention illustrated in the Figs. 7 to 12, a lever 26 is pivotally mounted with one of its ends at 25 just below the top wall of the camera casing 1. The other end of the lever 26 is provided with a gear segment 28 meshing with a gear 30 fixedly mounted on a vertical shaft 31. The shaft 31 is rotatably supported in the camera casing 1 and has attached thereto a drum 30$^a$ arranged between the finder window 34 in the front wall of the camera casing and an ocular opening 36 in the rear wall thereof. The circumferential wall 30$^b$ of the drum 30$^a$ is provided with a plurality of rectangular openings 33 each of which is adapted to be positioned behind the finder window 34 to modify the image area of the finder in accordance with the focal length or picture angle respectively, of the photographic objective attached to the camera. The rectangular openings 33 of the drum 30$^a$ may also be provided with optical members, i. e., pairs of lenses, Fig. 14, which modify the image area appearing in the finder.

The horizontally disposed lever 26 is provided with a downwardly extending pin 27 which projects into the path of the objective mount inserted in the camera casing. The rear edge of each mount 38, 38$^a$, 38$^b$, and 38$^c$ of the interchangeable objectives having different focal length is located a different distance away from the customary bayonet lugs 35, 35$^a$, 35$^b$, 35$^c$ respectively, on the rear portion of the respective mounts as illustrated in the Figs. 9 to 12. This has the result, that the rear edge of the mounts when inserted in the camera and when engaging thereby the pin 27 cause the lever 26 and therewith the gear segment 28 to rotate through different angles in order to rotate the drum 30$^a$ more or less so as to automatically adjust the image area appearing in the finder to the size required by the particular objective in the mount which is attached to the camera.

What I claim as my invention is:

1. In a photographic camera, a camera casing, means for detachably attaching to said casing selectively any one of a number of interchangeable objective mounts for photographic objectives having different picture angles, a finder within said casing, and means within said casing for varying the size of the image area appearing in said finder, each of said objective mounts being provided with means engaging and differently actuating said image area varying means when the photographic objective mount is attached to the camera casing so as to adjust automatically the image area of the finder to correspond with the picture angle of the photographic objective in said mount.

2. In a photographic camera of the type adapted to be provided selectively with any one of a number of interchangeable mounts for photographic objectives of different focal length, each of said mounts being provided with a fixed abutment at a different predetermined location, a camera casing, means on said casing for detachably supporting any one of said photographic objective mounts, a finder within said casing, and means within said casing and actuated by the said abutment on the objective mount during the attachment of the latter to said supporting means for adjusting the area of the image appearing in said finder to a size corresponding to the focal length of the objective in said mount.

3. In a photographic camera of the type adapted to be provided selectively with any one of a number of interchangeable mounts for photographic objectives of different focal length, each of said mounts being provided at a different predetermined location with a fixed abutment, a camera casing, a mounting ring on said camera casing for detachably supporting any one of said objective mounts, a finder within said camera casing, means within said camera for changing the size of the image area of said finder, and means actuated by the said abutment on the objective mount during the attachment of the mount to said mounting ring for operating said image area changing means so as to adjust the image area of the finder to a size corresponding to the focal length of the photographic objective in said mount.

4. In a photographic camera of the type adapted to be provided selectively with any one of a number of interchangeable mounts for photographic objectives of different focal length, a camera casing, a mounting ring on said camera casing for detachably supporting one of said objective mounts, a finder within said camera casing, means for changing the size of the image area of said finder, and means actuated by the objective mount during its attachment to said mounting ring for operating said image area changing means so as to adjust the image area of the finder to a size corresponding to the focal length of the photographic objective in said mount, said operating means including an annular member rotatably mounted within the camera casing coaxially with said mounting ring, means for operatively coupling said annular member with a different predetermined portion of the respective objective mounts, gear teeth on said annular member, a gear meshing with said gear teeth, and means operatively connecting said gear with said image area changing means.

5. In a photographic camera of the type adapted to be provided selectively with any one of a number of interchangeable mounts for photographic objectives of different focal length, each of said mounts being provided with a fixed abutment at a different predetermined location, a camera casing, a mounting ring on said camera casing for detachably supporting one of said objective mounts, a finder within said camera casing, and means for changing the size of the image area of said finder, said means being actuated by the objective mount when the latter is attached to said mounting ring and automatically adjusts said image area to a size corresponding to the focal length of the objective in said mount, said last named means including a pivotally mounted gear segment oscillated by the said abutment on said mount, a gear meshing with said gear segment, and a rotatable member provided with a plurality of apertures of different size operatively connected with said gear, each said apertures being adapted to be moved in alinement with the viewing axis of said finder to modify the image area thereof.

6. In a photographic camera of the type adapted to be provided selectively with any one of a number of interchangeable mounts for photographic objectives of different focal length, a camera casing, a mounting ring on said camera casing for detachably supporting one of said objective mounts, a finder within said camera casing, and means for changing the size of the image area of said finder, said means being actuated by the objective mount when the latter is attached to said mounting ring and automatically adjusts said image area to a size corresponding to the focal length of the objective in said mount, said last named means including an annular disc provided with a gear segment and rotatably mounted coaxially with said mounting ring, a pin on said mount for engaging said annular disc and rotating the same when the mount is rotated within said mounting ring, a gear meshing with said gear segment, and a rotatable member provided with a plurality of apertures of different size operatively connected with said gear, each said apertures being adapted to be moved in alinement with the viewing axis of said finder to modify the image area thereof.

7. In a photographic camera of the type adapted to be provided selectively with any one of a number of interchangeable mounts for photographic objectives of different focal length, a camera casing, a mounting ring on said camera casing for detachably supporting one of said objective mounts, a finder within said camera casing, and means for changing the size of the image area of said finder, said means being actuated by the objective mount when the latter is attached to said mounting ring and automatically adjusts said image area to a size corresponding to the focal length of the objective in said mount, said last named means including a gear segment pivotally mounted within said camera casing and oscillated by the rear end of the objective mount when the latter is axially pushed into said mounting ring, a gear meshing with said gear segment, a shaft on which said gear is mounted, and a drum fixedly mounted on said shaft, said drum having a plurality of windows in its circumferential wall, each said windows being adapted to be moved in alinement with the viewing axis of said finder to modify the image area thereof.

8. In a photographic camera of the type adapted to be provided selectively with any one of a number of interchangeable mounts for photographic objectives of different focal length, a camera casing, a mounting ring on said camera casing for detachably supporting one of said objective mounts, a finder within said camera casing, and means for changing the size of the image area of said finder, said means being actuated by the objective mount when the latter is attached to said mounting ring and automatically adjusts said image area to a size corresponding to the focal length of the objective in said mount, said last named means including horizontally disposed a gear segment pivotally mounted within said camera casing and oscillated by the rear end of the objective mount when the latter is axially pushed into said mounting ring, a gear meshing with said gear segment, a vertical shaft on which said gear is mounted, a drum fixedly mounted on said shaft, said drum having a plurality of windows in its circumferential wall, and optical members within said windows, each said windows being adapted to be moved in alinement with the viewing axis of said finder to modify the image area thereof.

9. In a photographic camera of the type adapted to be provided selectively with any one of a number of interchangeable mounts for photographic objectives of different focal length, each of said mounts being provided at a different predetermined location with a fixed abutment, a camera casing, a mounting ring on said camera casing for detachably supporting one of said objective mounts, a finder within said camera casing, and means for changing the size of the image area of said finder, said means being actuated by the said abutment on the objective mount when the latter is attached to said mounting ring and automatically adjusts said image area to a size corresponding to the focal length of the objective in said mount, said last named means including a pivotally mounted gear segment oscillated by said abutment, a gear meshing with said gear segment, two slidably supported parallel rack bars meshing with diametrically opposed portions of said gear, and angle shaped members, one on each said rack bars, said angle-shaped members forming together a rectangular frame in axial alinement with the viewing axis of said finder, the opening in said frame being varied whenever said gear segment is actuated.

10. In a photographic camera of the type adapted to be provided selectively with any one of a number of interchangeable mounts for photographic objectives of different focal length, a camera casing, a mounting ring on said camera casing for detachably supporting one of said objective mounts, a finder within said camera casing, and means for changing the size of the image area of said finder, said means being actuated by the objective mount when the latter is attached to said mounting ring and automatically adjusts said image area to a size corresponding to the focal length of the objective in said mount, said last named means including an annular disc provided with a gear segment and rotatably mounted coaxially with said mounting ring, a pin on said mount for engaging said annular disc and rotating the same when the mount is rotated within said mounting ring, a gear meshing with said gear segment, slidably supported parallel rack bars meshing with diametrically opposed portions of said gear, and angle shaped members, one on each said rack bars, said angle-shaped members forming together a rectangular frame in axial alinement with the viewing axis of said finder, the opening in said frame being varied whenever said gear segment is actuated.

11. In a photographic camera of the type adapted to be provided selectively with any one of a number of interchangeable mounts for photographic objectives of different focal length, a camera casing, a mounting ring in the form of a bayonet socket on said camera casing for detachably supporting any one of said objective mounts, bayonet lugs on said mounts, a finder within said camera casing, and means for changing the size of the image area of said finder, said means being actuated by the objective mount when the latter after being inserted in said mounting ring is rotated into locking engagement with the same so as to automatically adjust said image area to a size corresponding to the focal length of the objective in said mount, said last named means including a rotatably mounted gear segment arranged coaxially with said mounting ring and oscillated by said mount, a gear meshing with said gear segment, and a rotatable member provided with a plurality of rectangular apertures of different size operatively connected with said gear, each said apertures being adapted to be moved in alinement with the viewing axis of said finder to modify the image area thereof.

12. In a photographic camera of the type adapted to be provided selectively with any one of a number of interchangeable mounts for photographic objectives of different focal length, a camera casing, a bayonet socket on said camera casing for detachably supporting any one of said objective mounts, bayonet lugs on said mounts, a finder within said camera casing, and means for changing the size of the image area of said finder, said means being actuated by the objective mount when the latter is inserted in said bayonet socket and automatically adjusts said image area to a size corresponding to the focal length of the objective in said mount, said last named means including an annular disc provided with a gear segment and rotatably mounted coaxially with said bayonet socket, a pin on said mount for engaging said annular disc and rotating the same when the mount is rotated into locking position within said bayonet socket, a gear meshing with said gear segment, and a rotatable member provided with a plurality of apertures of different size operatively connected with said gear, each said apertures being adapted to be moved in alinement with the viewing axis of said finder to modify the image area thereof.

13. In a photographic camera of the type adapted to be provided selectively with any one of a number of interchangeable mounts for photographic objectives of different focal length, a camera casing, a bayonet socket on said camera casing for detachably supporting any one of said objective mounts, bayonet lugs on said mounts, a finder within said camera casing, and means for changing the size of the image area of said finder, said means being actuated by the objective mount when the latter is inserted in said bayonet socket and automatically adjusts said image area to a size corresponding to the focal length of the objective in said mount, said last named means including an annular disc provided with a gear segment and rotatably mounted coaxially with said bayonet socket, a pin on said mount for engaging said annular disc and rotating the same when the mount is rotated to lock said bayonet lugs in said socket, a gear meshing with said gear segment, slidably supported parallel rack bars meshing with diametrically opposed portions of said gear, and angle shaped members, one on each said rack bars, said angle-shaped members forming together a rectangular frame in axial alinement with the viewing axis of said finder, the opening in said frame being varied whenever said gear segment is actuated.

HUBERT NERWIN.